Figure 1:
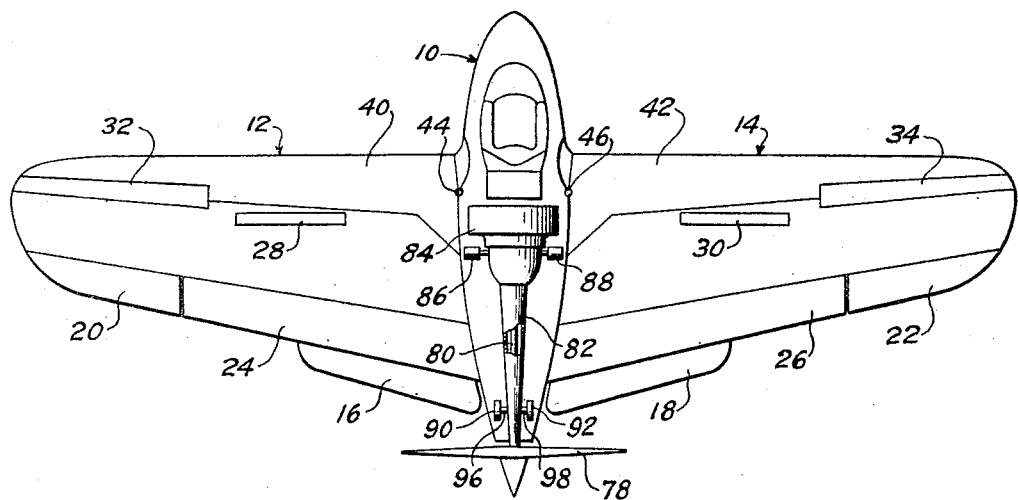

Sept. 4, 1945.  M. E. GLUHAREFF  2,384,296
TAILLESS AIRPLANE WITH MOVABLE POWER PLANT
Original Filed June 29, 1939

INVENTOR
*Michael E. Gluhareff*
BY *Harris G. Luther*
ATTORNEY.

Patented Sept. 4, 1945

2,384,296

UNITED STATES PATENT OFFICE 2,384,296

TAILLESS AIRPLANE WITH MOVABLE POWER PLANT

Michael E. Gluhareff, Stratford, Conn., assignor to United Aircraft Corporation, East Hartford, Conn., a corporation of Delaware Original application June 29, 1939, Serial No. 281,821. Divided and this application March 12, 1942, Serial No. 434,324

2 Claims. (Cl. 244—56)

This application is a division of United States application Serial No. 281,821, filed June 29, 1939, by Michael E. Gluhareff for Tailless airplanes, now Patent No. 2,293,644, issued August 18, 1942, and relates to improvements in tailless airplanes or sailplanes and particularly to improvements in the propulsive mechanism for such an airplane.

An object of the invention resides in the provision of an airplane of the character indicated having a propeller disposed at the rear thereof, of means for elevating the propeller relative to the airplane without disrupting the driving connection between the propeller and the propeller driving engine or materially disturbing the relationship between the propeller thrust line and the center of gravity of the airplane.

A further object resides in the provision of means for changing the attitude of an airplane propelling means from a position adapted for maneuvering the aircraft on the ground to a flight attitude or vice versa.

A somewhat more general object resides in the provision of a tailless airplane especially equipped for safe and convenient landing and take-off and for efficient flight.

Other objects and advantages will be more particularly pointed out hereinafter or will become apparent as the description proceeds.

In the accompanying drawing, in which like reference numerals are used to designate similar parts throughout, there is illustrated a suitable mechanical arrangement of an airplane constructed according to the invention. The drawing, however, is for the purpose of illustration only and is not to be taken as in any way limiting or restricting the scope of the invention as set forth in the appended claims.

Figure 2:
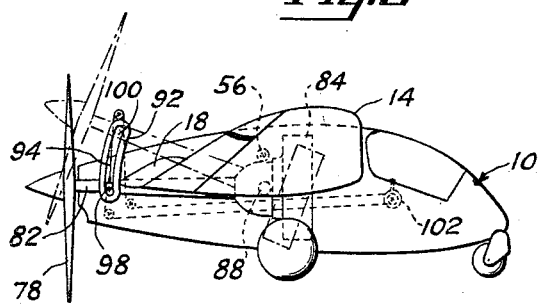

In the drawing,

Fig. 1 is a top plan view of an airplane constructed according to the invention, and Fig. 2 is a side elevational view of the airplane shown in Fig. 1.

Referring to the drawing in detail, the numeral 10 generally designates the fuselage, hull or cabin of an airplane and the numerals 12 and 14 designate the left hand and right hand supporting wings respectively. As shown the fuselage 10 is a comparatively short, completely streamlined, body and the usual tail or empennage is omitted. In the form illustrated the wings 12 and 14 project outwardly from a position near the vertical center of the fuselage and are inclined somewhat upwardly from their root to their tip ends to provide the usual dihedral angle essential to flight stability. The chord length of the root portions of the wings overlaps the greater portion of the length of the fuselage or cabin and the trailing edges of the wings incline forwardly at a moderate angle.

The elevation changing attitude, or angle of attack, of the airplane is controlled by a pair of elevators 16 and 18 in the form of movable flaps hinged to the trailing edges of the wing flaps adjacent to the root portions of the respective wings. Lateral control, or the bank and turn attitude, of the airplane is effected by a pair of ailerons 20 and 22 hinged to the rearward edges of the respective wings at the outer or tip portions of the wings. Wing lift changing flaps 24 and 26 constitute the rearward portions of the respective wings between the inner ends of the ailerons 20 and 22 and the adjacent side of the fuselage 10, and the elevators 16 and 18 are carried by the rearward or trailing edges of the respective movable flaps 24 and 26, thus placing the elevators entirely to the rear of the main wing structures. This arrangement of the elevators and the forward inclination of the rear edges of the wings places the ailerons 20 and 22 a considerable distance ahead of the respective elevators 16 and 18 and brings the ailerons sufficiently near the axis of the center of lift of the wings so that operation of the ailerons to change the banking attitude of the airplane does not materially affect the pitching stability of the airplane, and places the elevators in a position sufficiently to the rear of the axis of the center of lift so that the control of the angle of attack as obtained by the elevators is sufficiently sensitive.

If desired, the wings may be additionally provided with controllable lift-increasing airflow slots as indicated at 32 and 34 and with lift spoilers as indicated at 28 and 30 to provide a glide control.

In the construction illustrated in Fig. 1, the rigid wing portion 40 is pivotally connected at its inner end to the side of the fuselage 10 by a substantially vertical pivot 44 and the wing portion 42 is connected to the fuselage by a similar pivot 46. At their rearward inner corners the wing portions 40 and 42 are connected to the respective ends of aligned laterally movable elements which may be carried upon the outer ends of a hydraulic ram device or screw jack as indicated at 58.

The airplane shown by way of example in the accompanying drawing is of a type commonly known as the pusher type, that is, the propeller is located to the rear of the wings. In order to have the thrust line of the propeller pass through or near to the center of gravity and center of resistance of the airplane to avoid unbalanced propulsive forces, it is necessary that the lower portion of the propeller disc extend below the fuselage. This would mean that, if maintained in its normal flight position, there would be danger of the propeller's striking the ground during the landing and take-off of the airplane. In order to have the propeller in the proper position for flight and at the same time avoid the danger of the propeller's striking the ground, the powerplant is pivotally mounted so that the propeller can be tilted upwardly from the flight position shown in full lines in Fig. 2 to the landing and take-off position shown in broken lines. In the illustrated arrangement, the propeller 78 is mounted upon the end of a drive shaft 80 which extends rearwardly through a supporting tube 82 from the driving end of the engine 84. Pivotal mounts 86 and 88 are provided on a line passing through or near to the center of gravity of the powerplant for the tilting movement explained above in connection with Fig. 2. The distance of the propeller from the engine is such that an upward inclination not in excess of thirty degrees will bring the lower edge of the propeller disc above the bottom of the fuselage, or at least to a position in which the propeller safely clears the ground. Suitable means are provided for tilting the powerplant about the axis of the pivotal supports 86 and 88, such means taking the form, in the case illustrated, of a pair of upstanding arcuate guides 90 and 92 rigidly secured at their lower ends to the fuselage 10 and disposed one upon each side of the tube 82, and a cable 94 which extends over pulleys at each end of the guide member and is connected to one of the two guide pins 96 and 98 which extend from the tube 82 into elongated curved slots, as indicated at 100, in the guide members. The cable 94 may be suitably guided to the cockpit of the airplane and there connected with a manually controllable actuating device, as indicated at 102, by means of which the cable may be operated to tilt the powerplant in the manner indicated above. If desired, a pair of cables may be used disposed one at each side of the tube 82 and associated respectively with the parallel guide members 90 and 92.

While a particular structural arrangement of an airplane has been illustrated in the accompanying drawing and hereinabove described in order to disclose the invention, it is to be understood that the invention is not limited to the particular arrangement so illustrated and described, but that such changes in the size, shape and arrangement of the various components thereof may be resorted to as come within the scope of the sub-joined claims.

Having now described the invention so that others skilled in the art may clearly understand the same, what it is desired to secure by Letters Patent is as follows:

1. In combination, a tailless airplane having a rear mounted propeller and propeller driving means including an engine, a pivotal support for the engine-propeller combination having an axis substantially parallel to the spanwise axis of said airplane and passing through a point in said airplane substantially coincident with the center of gravity of said airplane and intersecting the axis of rotation of said propeller at the center of gravity of said engine-propeller combination, so that the thrust line of said propeller passes substantially through the location of the center of gravity of the airplane and through the center of gravity of said engine-propeller combination, and manuually controllable means between said engine-propeller combination and said airplane for changing the vertical location of said propeller with respect to said airplane by tilting said engine-propeller combination about said pivotal support without disrupting the driving connection between said engine and said propeller or moving said thrust line away from the center of gravity of the airplane.

2. In combination, a tailless aircraft having a rear mounted propeller and a propeller driving engine so arranged that the center of gravity of said combined engine and propeller combination is substantially coincident with the location of the center of gravity of the aircraft, means supporting said propeller on said engine, a pivotal support connected to said engine and said aircraft having its axis passing through the center of gravity of said engine-propeller aircraft combination, and means for tilting said engine-propeller combination about said pivotal support to change the vertical location of said propeller with respect to said aircraft without disrupting the driving connection between said engine and said propeller or disturbing the balance of the aircraft.

MICHAEL E. GLUHAREFF.